United States Patent [19]

Christensen et al.

[11] 3,843,641

[45] Oct. 22, 1974

[54] PROCESS FOR PREPARING PENICILLIN AND CEPHALOSPORIN COMPOUNDS

[75] Inventors: Burton G. Christensen, Scotch Plains; Lovji D. Cama, Edison, both of N.J.

[73] Assignee: Merck & Co., Inc., Rahway, N.J.

[22] Filed: Aug. 2, 1972

[21] Appl. No.: 277,464

Related U.S. Application Data

[63] Continuation-in-part of Ser. No. 203,057, Nov. 29, 1971, abandoned.

[52] U.S. Cl...........260/243 C, 260/239.1, 424/271, 424/246
[51] Int. Cl....................... C07d 99/24, C07d 99/16
[58] Field of Search...................... 260/243 C, 239.1

[56] References Cited
FOREIGN PATENTS OR APPLICATIONS

| | | | |
|---|---|---|---|
| 2,129,675 | 12/1971 | Germany | 260/243 C |
| 1,348,774 | 12/1963 | France | 260/243 C |

OTHER PUBLICATIONS

Morrison and Boyd; Organic Chemistry, 1969, pp. 466–467.

*Primary Examiner*—Nicholas S. Rizzo
*Assistant Examiner*—Mary C. Vaughn

[57] ABSTRACT

A process is provided which yields 7-$R_1$ or 6-$R_1$ derivatives of cephalosporins or penicillins, respectively, wherein $R_1$ is methoxy, azido, cyano, fluoro, or chloro. The starting material is a 7-imino, 7-halo, or 6-imino, 6-halo cephalosporin or penicillin which is reacted with a suitable reagent to form the desired side chain derivative. The 7-imino side chain is then removed in the optional presence of a metal catalyst and treatment with an acylating agent yields the final 7-acylamino-7-methoxy cephalosporins or the corresponding 6-substituted penicillins. The end products are active antibacterial agents.

11 Claims, No Drawings

PROCESS FOR PREPARING PENICILLIN AND CEPHALOSPORIN COMPOUNDS

This application is a continuation-in-part application of U.S. Ser. No. 203,057, filed Nov. 29, 1971, now abandoned.

This invention relates to a new process for preparing compounds known chemically as 7-acylamino-cephalosporanic acid derivatives having a methoxy substituent at position-7. This process is also useful in preparing the analogous 6-substituted compounds in the penicillin series.

The compounds prepared by the process of this invention are the following, (the numbers indicate ring position):

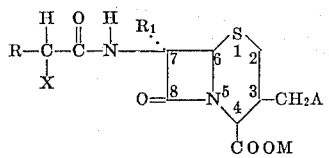

I and

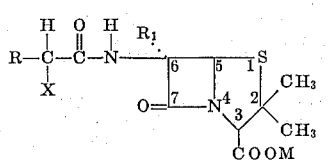

wherein $R_1$ is methoxy, azido, cyano, chloro, or fluoro;

X is hydrogen, amino, or carboxyl;

R is phenyl or a 5-membered heterocyclic ring having 1-2 hetero atoms, the latter being either S, O, or N;

A is hydrogen, loweralkanoyloxy, carbamoyloxy, thiocarbamoyloxy, N-loweralkylcarbamoyloxy, N-loweralkylthiocarbamoyloxy, N,N-diloweralkylcarbamoyloxy, N,N-diloweralkyl, thiocarbamoyloxy, pyridinium, alkylpyridinium, halopyridinium, or aminopyridinium;

and M is sodium, potassium, benzyl, benzhydryl, trimethylsilyl, trichloroethyl, methoxymethyl, hydrogen, benzoylmethyl, or methoxybenzyl.

The nomenclature used in this application is further defined as follows. The compound,

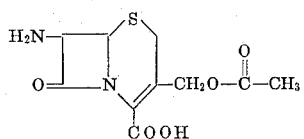

II is called 7-aminocephalosporanic acid. The side chain at 3 is inherently contained in the name. By comparison, the skeleton

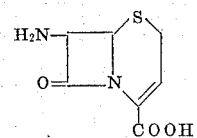

is called 7-aminodecephalosporanic acid. Derivatives of this compound which have substituents at 3 are named 7-amino-3-R-decephalosporanic acid.

In the above structural formulas, Compound I is 7-acylamino-7-$R_1$-3-$CH_2A$-decephalosporanic acid and esters thereof and Compound II is a 6-acylamino-6-$R_1$-penicillanic acid and esters thereof.

In summary, this invention provides a route for substituting the desired $R_1$ group at position 7 (or 6) of the desired cephalosporin (or penicillin).

The starting materials useful in this process are the following:

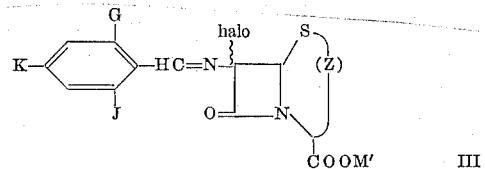

III wherein J, G, or K each independently is nitro, methylsulfonyl, halo, cyano or hydrogen; and M' is benzyl, benzhydryl, trimethylsilyl, trichloroethyl, methoxymethyl, benzoylmethyl, or methoxybenzyl, and —Z— is used in Formula III to represent either the group

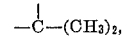

or the group

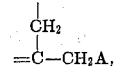

respectively, representing the penicillin or the cephalosporin structures. A is as defined above. The use of Z is appropriate since any of a great number of substituents can depend from that part of the ring, in both the penicillin and the cephalosporin series. The inventive process of this invention, involving as it does the carbon adjacent to the amino group, is not affected by the substituent at Z. One can readily see that the exemplary substituents of this application are illustrative only of preferred embodiments and that many other substituents can be employed. The "halo" substituent is bromo or chloro. Either one of these can be used to prepare the compounds where $R_1$ is fluoro, or the bromo can be used to prepare compounds where $R_1$ is chloro. In other words, the chloro can be used as a starting material or can be prepared via another halo intermediate.

This starting material III is prepared from a 7-imino or 6-imino compound which is first activated through reaction with a strong base. The strong base is preferably an inorganic base, such as sodium hydride, phenyl lithium, t-butyl lithium, and the like. Most preferably, phenyl lithium or t-butyl lithium, or sodium hydride is used. The base is added to a solution of the starting material at a low temperature (−100° to −60°C.) and under an inert atmosphere. An inert solvent is employed, such as tetrahydrofuran, acetonitrile, and the like. Sufficient base is added (usually one equivalent) and a strong color change is produced in the solution. The color is an indicator that the activated salt form is present.

The activated intermediate is not isolated, and the next reagent added directly to the reaction. This reagent is a brominating or chlorinating reagent chosen from any of a number of suitable chemicals. N-bromosuccinimide, N-bromoacetamide are both suitable, as is molecular bromine. In addition, t-butyl hypochlorite or perchloromethyl hypochlorite are equally useful. The halogenating reagent is added in an amount approximately equivalent to the moles of the activated intermediate compound. The reaction proceeds immediately, as evidenced by a color change. The reaction mixture is then permitted to come up to 0°C.-ambient temperatures. The reaction product is an intermediate halogenated compound, III. Compound III is relatively stable, but is preferably not isolated in pure form, since it is of value primarily as an intermediate. Therefore, for the purposes of practice of this invention, it is maintained in a concentrated solution. It is noted that the intermediate compound III and the process for its preparation do not form a part of this invention but are claimed in a copending application in the names of Firestone, Johnston, and Christensen.

The halo-intermediate III is reacted with a suitable nucleophilic reagent to form a 7-$R_1$ compound IV:

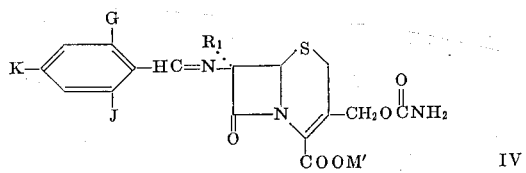

The reaction to prepare Compound IV is primarily a simple mixing of the concentrated solution of Compound IV and the reagent.

The specific identity of the reagent is obviously dependent upon the desired $R_1$ group. When $R_1$ is methoxy, the reagent employed is methanol; when $R_1$ is azido, cyano, or halo, the reagent is a tertiary amine salt containing the respective azide, cyanide, chloride, or fluoride in anionic form. Suitable tertiary amine cations include triloweralkylammonium, such as triethylammonium and pyridinium. As typical examples of useful salts, are included triethylammonium azide, pyridinium cyanide, triethylammonium chloride, and the like. The tertiary amine salts can be easily prepared and used in the reaction described below. Also, the silver salts of the incoming groups, e.g., AgF, AgCN, can be used in the presence of an inert polar solvent such as acetonitrile.

Optionally, the reaction mixture can also contain a third component, which can function as a scavenger for the hydrogen bromide given off during the reaction. The optimal scavenger has been determined to be silver oxide, due to the fact that silver halides are insoluble salts in the reaction medium. However, many basic materials, such as barium oxide, calcium oxide, cuprous oxide, or triethylamine, can also be used in the reaction. The use of silver oxide is necessary when methanol is used; the silver oxide is optional when the other reagents are used, since the cation of the salt functions as the scavenger.

The amount of the three components can be varied in the reaction. However, it is preferable to employ the nucleophilic reagent in molecular excess over the bromo intermediate III, and a similar molecular excess of the optional silver oxide. At the end of the reaction, which proceeds quickly at ambient temperatures, the crude product IV can be isolated.

Compound IV can then be directly acylated to the desired 7-acylamino-7-methoxy compounds I or II by reaction with molecular excess of an acyl halide or acyl anhydride. The acyl halides can be, for instance, phenylacetyl chloride, furylacetyl chloride, thienylacetyl chloride, phenyl($\alpha$-carboxyacetyl)chloride, thienyl($\alpha$-carboxyacetyl)chloride, and the like. When carboxy groups are present in the acyl halide, such as the phenyl($\alpha$-carboxyacetyl)chloride, these $\alpha$-carboxyl groups are blocked using, e.g., a benzyl or benzhydryl substituent which can be removed easily later. The reaction is conducted in an inert solvent in the presence of an optional metal catalyst and at a temperature preferably about 0°-15°C., although the reaction temperature can be from about −20°C. to 20°C. The final product is isolated by standard procedures, most suitably preparative thin-layer chromatography or column chromatography.

In the acylation reaction, we have found that the optional process utilizes a metal catalyst. The process proceeds best when conducted in two steps. The first step utilizes the catalyst in solvent. The Schiff's base is dissolved in an inert polar solvent, such as tetrahydrofuran, dimethylsulfoxide, dioxane, dimethylformamide, methanol, ethanol, methylene chloride, or chloroform. A small additional amount of water is then added; a volume such that the solvent to water volume:volume ratio is about 5–6:1. Then the metal catalyst is added. This catalyst can be described as $ML_n$ wherein M is a metal such as palladium, platinum, nickel, ruthenium, rhodium, cobalt, or iron; and L is a ligand such as halo; carbonyl (—CO—); cyclopentadienyl ($\pi C_5H_5$); phenylcyano (Ph-C ≡ N); and $n$ is an integer such that the valence requirements are satisfied. More preferably, the metal is palladium or platinum, and L is halogen, preferably chloride. The most preferred catalyst is palladium chloride ($PdCl_2$). The amount of catalyst needed is from ½ to 1 molar equivalents of the amount of the Schiff's base in the reaction, although a small excess can also be used.

The reaction mixture is then stirred at ambient temperature for 1–5 hours. The solvent is then removed at reduced pressure. After trituration with petroleum ether or a similar inert solvent. A crystallizable residue is recovered which is a complex of the metal and the amino-containing cephalosporin (or penicillin). This residue is then dissolved in a polar solvent, such as methylene chloride, chloroform, ethyl acetate, or diethylether, and cooled to about 0°–15°C. An excess of an organic base, such as pyridine, triethylamine, triisopropylamine, or the like is then added, followed by the addition of an approximately equimolar amount of the desired acyl halide or acyl anhydride. The reaction mixture is stirred at the low temperature for another 10–20 minutes, then allowed to warm to ambient temperature. The reaction product is then isolated by purification using techniques substantially as described before.

The above reaction can also be conducted in a single step if desired. Instead of removing the solvent from step 1, above, the mixture is cooled and the base and acyl halide added. The reaction proceeds in better yield, and it is easier to purify the final product, however, when the reaction is done in the two steps.

The other starting materials, 7-(substituted-benzylideneamino)cephalosporanates, can also be easily prepared. One process for preparing these compounds is described herein; the process is not a part of this invention but is in a copending application in the names of Christensen, Firestone, and Johnston, co-workers in the laboratory of the same assignee.

Specifically, the starting material is prepared from either 6-amino-penicillanic acid or 7-amino-cephalosporanic acid. The processes of this invention, involving as they do the carbon adjacent to the amino group, are not affected by the substituent at position 3 of the cephalosporin nucleus. One can readily see that the exemplary substituents of this application are illustrative only of preferred embodiments and that many other substituents can be employed.

The reactant employed in this reaction is an aromatic aldehyde. Preferably, benzaldehyde, wherein J, G, or H are each hydrogen, is employed. Other suitable reagents can have at least one o- or p-electronegative substituent. For example, at least one of J, G, and H is a substituent selected from the group consisting of halo, nitro, methyl sulfonyl, carboxyl derivatives such as esters or amides, cyano, and the like. The other two of J, G, and H can either be one of the above electronegative substituents, or hydrogen. One operable reactant is p-nitrobenzaldehyde, where J=nitro, and G and H=hydrogen. Other carbonyl containing compounds, e.g., aldehydes and ketones such as acetone, hexafluroacetone or chloral which will form stable imino derivatives will also be operable in this invention.

The starting material and the aromatic aldehyde are mixed together in approximately equimolar amounts in an inert solvent. Suitable solvents are dioxane, ethyl alcohol, acetonitrile, dimethylformamide, dimethylsulfoxide, benzene, toluene, and the like. The aldehyde can be employed in a molecular excess if desired. The reaction proceeds readily at temperatures ranging from ambient to reflux temperature of the solvent. Since this condensation is an equilibrium reaction and since water is one of the products of the reaction, water is removed from active participation in further reactions by any of a number of usual methods, including azeotropic distillation, molecular sieves, $K_2CO_3$, or borate esters. The particular method is dependent upon the exact parameters of the reaction. The reaction is terminated by removal of the water. The imino derivative is then recovered and used as described herein.

The final products, such as sodium or potassium 7β-thienylacetamido-7α-methoxy-3-carbamoylxymethyl-decephalosporanate, or the free acids or esters, are useful as an antibacterial agent against both gram-positive and gram-negative bacteria. In addition, resistance to β-lactamases has been demonstrated. The activity spectrum of all the compounds includes effectiveness against many bacteria, including in vivo on *Proteus morganii*, and in addition, against *E. coli*, *P. vulgaris*, *P. mirabilis*, *S. schottmuelleri*, *K. pneumoniae AD*, *K. pneumoniae B*, and *P. arizoniae*.

In addition to the specific end products as defined in structural formulae I and II, other compounds which are also active antibacterials can also be prepared using the process described herein. The compounds which can be prepared have the following structural formula:

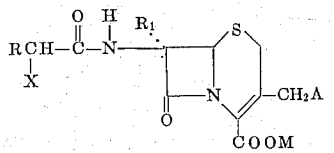

V

It is noted that the analogous $\Delta^2$ compounds which can also be prepared using the processes described herein are valuable intermediate compounds because of their greater acid stability and can be converted to $\Delta^3$ compounds easily. The various substituents have the following meanings:

X is hydrogen, halo, amino, guanidino, phosphono, hydroxy, tetrazolyl, carboxyl, sulfo, or sulfamino;

R is phenyl, substituted phenyl, a monocyclic heterocyclic 5- or 6-membered ring containing one or more oxygen, sulfur, or nitrogen atoms in the ring, substituted hererocycles, phenylthio, heterocyclic, or substituted heterocyclic thio-groups, or cyano; the substituents on the R group being halo, carboxymethyl, guanidino, guanidinomethyl, carboxamidomethyl, aminomethyl, nitro, methoxy, or methyl;

A is hydrogen, hydroxy, halo, mercapto, cyano, alkanoyloxy, alkanoylthio, aroyloxy, aroylthio, heteroaryloxy or heteroarylthio, the hetero ring having 5–6 members and having 1–3 hetero atoms, being O, S, or N or combinations thereof, azido, amino, carbamoyloxy, alkoxy, alkylthio, carbamoylthio, thiocarbamoyloxy, benzoyloxy, (p-chlorobenzoyl)oxy, (p-methylbenzoyl)oxy, pivaloyloxy, (1-adamantyl)carboxy, substituted amino such as alkylamino, dialkylamino, alkanoylamino, carbamoylamino, N-(2-chloroethylamino), 5-cyano-triazol-1-yl, 4-methoxycarbonyl-triazol-1-yl, or quaternary ammonium such as pyridinium, 3-methylpyridinium, 4-methylpyridinium, 3-chloropyridinium, 3-bromopyridinium, 3-iodopyridinium, 4-carbamoylpyridinium, 4-(N-hydroxymethylcarbamoyl)pyridinium, 4-(N-carbomethoxycarbamoyl)pyridinium, 4-(N-cyanocarbamoyl)pyridinium, 4-(carboxymethyl)pyridinium, 4-(hydroxymethyl)pyridinium, 4-(trifluoromethyl)pyridinium, quinolinium, picolinium, or lutidinium; N-loweralkylcarbamoyloxy, N,N-diloweralkylthiocarbamoyloxy, alkanoylcarbamoyloxy, hydroxyphenyl, sulfamoyloxy, alkylsulfonyloxy, or (cis-1,2-epoxypropyl)phosphono;

and M is an alkali metal, benzyl, alkanoyloxymethyl, alkylsilyl, phenalkanoyl, benzhydryl, alkoxyalkyl, alkenyl, trichloroethyl, hydrogen, benzoylmethyl, or methoxybenzyl.

Preferably, R is phenyl, or a 5–6 membered heterocyclic ring having 1–2 heteroatoms, the latter being either S, O, or N;

X is hydrogen, amino, or carboxyl;

A is hydrogen, halo, azido, cyano, hydroxy, alkoxy, carbamoyloxy, thiocarbamoyloxy, N-loweralkylcarbamoyloxy, N,N-diloweralkylcarbamoyloxy, N-loweralkylthiocarbamoyloxy, N,N-diloweralkylthiocarbamoyloxy, alkanoyloxy, aroyloxy, mercapto, alkylthio, amino, alkylamino, alkanoylamino, hydroxyphenyl, sulfamoyloxy, quaternary ammonium, alkylsulfonyloxy, or (cis-1,2-epoxypropyl)phosphono;

and M is alkali metal, benzyl, alkylsilyl, phenalkanoyl, alkoxyalkyl, pivaloyloxymethyl, alkenyl, trichloroethyl, hydrogen, benzoylmethyl, or methoxybenzyl.

Even more preferably, X is hydrogen, amino, or carboxyl; R is phenyl or a 5-membered heterocyclic ring having 1–2 hetero atoms, the latter being either S, O, or N;

A is hydrogen, loweralkanoyloxy, heteroarylthio, carbamoyloxy, thiocarbamoyloxy, N-loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

Still more preferably, X is hydrogen or carboxyl;

R is phenyl, or a 5-membered heterocyclic ring having one O or one S hetero atom;

A is hydrogen, loweralkanoyloxy, carbamoyloxy, N-loweralkylcarbamoyloxy, N,N-diloweralkylcarbamoyloxy, pyridinium, alkylpyridinium, halopyridinium, or aminopyridinium;

and M is sodium, potassium, benzhydryl, methoxymethyl, or hydrogen.

Most preferably, X is hydrogen or carboxyl;

R is phenyl, thienyl, or furyl;

A is hydrogen, loweralkanoyloxy, carbamoyloxy, or pyridinium; and

M is sodium, potassium, benzhydryl, methoxymethyl, or hydrogen.

In addition, compounds of Formula V above wherein the sulfur atom is present as the sulfoxide

can be prepared in this inventive reaction.

It will also be apparent to one skilled in the art that the inventive reaction of this application can be employed to prepare analogous compounds in the penicillin series, viz.:

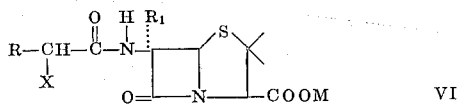   VI wherein R, R$_1$, X, and M are the same as defined in Formula V.

The compounds of Formula V can generally be prepared from 7-ACA or known derivatives thereof using the general processes outlined in the preparative examples.

The blocking group on the acid functionality at position-4 of the cephalosporin ring or position-3 of the penicillin ring can be removed following any of the reactions of this invention. The removal can be accomplished using methods available to those in the art.

The penicillins of Formula V can be prepared from 6-APA and known derivatives thereof using procedures analogous to those described for the cephalosporins.

In addition, many of the starting materials useful in the application of these inventive reactions can be prepared in accordance with known methods, see, e.g., Belgium Pat. No. 650,444 or U.S. Pat. No. 3,117,126 or using the following preparations.

The term "loweralkyl" is employed to mean a carbon chain having 1-6 carbon atoms; when more than one loweralkyl group appears in a substituent, the groups can be the same or different.

PREPARATION 1

3-Hydroxymethyl-7-Aminodecephalosporanic Acid

The 3-hydroxymethyl-7-aminodecephalosporanic acid is obtained as the lactone by acid hydrolysis of cephalosporin C in accordance with procedures known in this art.

PREPARATION 2

3-Pyridiniummethyl-7-Aminodecephalosporanic Acid

This compound is prepared by treating cephalosporin C with pyridine followed by acid hydrolysis as described in U.S. Pat. No. 3,117,126.

PREPARATION 3

3-Methyl-7-Aminodecephalosporanic Acid

This compound is prepared from cephalosporin C by catalytic reduction followed by hydrolytic removal of the 5-aminodipoyl side chain as described in U.S. Pat. No. 3,129,224.

PREPARATION 4

3-Chloromethyl-7-Aminodecephalosporanic Acid

This compound is prepared from the 3-methyl compound by reaction with chlorine gas. The bromomethyl or iodomethyl derivatives can be prepared from the 3-hydroxymethyl compound by reaction with phosphorus tribromide or phosphorus triiodide, respectively.

The starting materials used in the preparation of the compounds of formula I can be prepared as follows:

PREPARATION 5

3-Carbamoyloxymethyl-7-Aminodecephalosporanic Acid

7-Aminocephalosporanic acid is treated with 5-butoxycarbonylazide to produce the 7β-(t-butoxycarbonyl) derivative in accordance with known methods. This derivative is then intimately contacted with citrus acetylesterase in aqueous phosphate buffer at pH 6.5–7 for 15 hours and 3-hydroxymethyl 7β-(t-butoxycarbonyl)aminodecephalosporanic acid is recovered from the resulting reaction mixture.

To 0.2 g. of 3-hydroxymethyl 7β-(t-butoxycarbonyl)aminodecephalosporanic acid suspended in 5 ml. of acetonitrile, cooled to 0°C. and maintained under nitrogen atmosphere is added 0.15 ml. of chlorosulfonyl isocyanate. The reaction mixture is stirred for 70 minutes and then evaporated under diminished pressure to dryness. The resulting residue is taken up in 10 ml. of ethylacetate and 10 ml. of 0.1 N phosphate buffer. The pH of the aqueous layer is adjusted to about 1.6 and the mixture stirred for 2½ hours at room temperature. The pH is then adjusted to about 8 with aqueous tripotassium phosphate solution, and the aqueous phase is separated. The organic phase is re-extracted with 10 ml. of phosphate buffer at pH 8. The combined aqueous phase is adjusted to pH 2.1 with hydrochloric acid and extracted twice with ethylacetate. The ethylacetate extractions are dried over sodium sulfate and evaporated under diminished pressure to afford 0.055 g. of residue. This residue is washed with ether to afford 3-carbamoyloxymethyl-7β-(t-butoxycarbonyl)aminodecephalosporanic acid which is recovered as a yellow solid.

3-Carbamoyloxymethyl-7β-(t-butoxycarbonyl)aminodecephalosporanic acid (0.5 g.) in 3.5 ml. of anisole is stirred with 2 ml. of trifluoroacetic acid at 0°C. for 5 minutes. The resulting reaction mixture is evaporated under reduced pressure to afford 3-carbamoyloxymethyl-7-aminodecephalosporanic acid which is purified further by crystallization from water at pH 3.

PREPARATION 6

Trimethylsilyl 3-Carbamoyloxymethyl-7-Aminodecephalosporanate

A mixture of 0.5 mg. of 3-carbamoyloxymethyl-7-aminodecephalosporanic acid, 2 ml. of hexamethyldisilazane and 8 ml. of chloroform is stirred overnight at reflux temperature protected from moisture. The solvent and excess hexamethyldisilazane are removed at reduced pressure, leaving a residue containing trimethylsilyl 3-carbamoyloxymethyl-7-aminodecephalosporanate.

PREPARATION 7

Benzhydryl 7-Benzylideneamino-3-Carbamoyloxymethyldecephalosporanate

A. 7-Amino-3-Carbamoyloxymethyldecephalosporanic Acid Benzhydryl Ester

272 Mg. of 7-amino-3-carbamoyloxymethyldecephalosporanic acid is slurried 5 min. at 25°C. in 7 ml. dioxane with 170 mg. p-toluenesulfonic acid.$H_2O$. Methanol (2 ml.) is added, the solvents are removed in vacuo, and dioxane is twice added and evaporated in vacuo. Dioxane (8 ml.) is added, and then 290 mg. diphenyldiazomethane. After the evolution of nitrogen is complete, the solvent is distilled in vacuum, and the residue stirred with methylene chloride (10 ml.) and water (10 ml.) containing sufficient $K_2HPO_4$ to bring the pH to 8. The layers are separated and the aqueous portion extracted twice more with $CH_2Cl_2$. The combined organic layers are dried with sodium sulfate, filtered and evaporated, leaving oily crystals. Washing with ether affords a dry solid, which is the product, 7-amino-3-carbamoyloxymethyldecephalosporanic acid benzhydryl ester.

In a like manner, the benzhydryl and other esters of 3-methyl-7-aminodecephalosporanic acid, 3-chloromethyl-7-aminodecephalosporanic acid, and 7-aminocephalosporanic acid can be prepared.

B. 7-(Benzylideneamino)-3-Carbamoyloxymethyldecephalosporanic Acid Benzhydryl Ester The 7-amino-3-carbamoyloxymethyldecephalosporanic acid benzhydryl ester, as prepared in Step A, 439 mg., is refluxed 1 hour in 50 ml. benzene with 106 mg. benzaldehyde in an azeotropic drying apparatus. The solvent is vacuum distilled away, leaving 527 mg. of product which is used in the next step without further purification. Samples which are identified show the structure to be the 7-(benzylideneamino)-3-carbamoyloxymethyldecephalosporanic acid benzhydryl ester.

The other esters prepared in Step A can also be reacted to form the imino derivatives of the above procedure.

EXAMPLE 1

Benzhydryl 3-Carbamoyloxymethyl-7-Benzylideneamino-7-Methoxy-Decephalosporanate

A. Benzhydryl 3-Carbamoyloxymethyl-7-Bromo-7-Benzylideneaminodecephalosporanate

Benzhydryl 7-(benzylideneamino)-3-carbamoyloxymethyldecephalosporanate, 527 mg., is dissolved in 20 ml. dry tetrahydrofuran. At −78°C., under nitrogen, 0.435 ml. of 2.3 M phenyl lithium is added. The reaction mixture is stirred at −78°C. for 5 minutes. 0.2 G. of N-bromosuccinimide in 3 ml. of anhydrous tetrahydrofuran is then added. The cooling bath is removed and the reaction mixture allowed to come to 0°C. The solvent is removed under reduced pressure and the residue taken up in methylene chloride (30 ml.) and washed with pH 7 phosphate buffer, and then with water, dried, and evaporated to a volume of about 12 ml. This solution of benzhydryl 3-carbamoyloxymethyl-7-bromo-7-benzylideneaminodecephalosporanate is not further characterized but used directly in the next step.

B. Benzhydryl 3-Carbamoyloxymethyl-7-Benzylideneamino-7-Methoxy-Decephalosporanate 0.200 G. of silver oxide is suspended in 20 ml. of methanol. The solution of the 7-bromo-7-benzylideneamino derivative obtained in Step A is added dropwise over 10 minutes to the silver oxide suspension. The reaction mixture is stirred for another 15 minutes. The silver salts are removed by filtration, the filtrate evaporated, and the residue taken up in benzene and washed twice with pH 7 phosphate buffer then dried and evaporated to give the benzhydryl 3-carbamoyloxymethyl-7-benzylideneamino-7-methoxy-decephalosporanate as an oil.

EXAMPLE 2

Benzhydryl 3-Carbamoyloxymethyl-7-Benzylideneamino-7-Azido-Decephalosporanate

A solution of benzhydryl 3-carbamoyloxymethyl-7-bromo-7-benzylideneamino-decephalosporanate is prepared as in Example 1. A solution of 0.08 ml. of hydrogen azide and 0.3 ml. of triethylamine in 4 ml. of tetrahydrofuran is added. After 10 minutes of stirring, the reaction mixture is worked up as above. Chromatography affords the product, benzhydryl 3-carbamoyloxymethyl-7-benzylideneamino-7-azido-decephalosporanate.

The compounds, benzhydryl 3-carbamoyloxymethyl-7-benzylideneamino-7-cyano-decephalosporanate and benzhydryl 3-carbamoyloxymethyl-7-benzylideneamino-7-chloro-decephalosporanate are prepared similarly using hydrogen cyanide or hydrogen chloride, respectively, in place of hydrogen azide.

EXAMPLE 3

Benzhydryl 3-Carbamoyloxymethyl-7-(2-Thienylacetamido)-7-Methoxy-Decephalosporanate 50 Mg. of benzhydryl 3-carbamoyloxymethyl-7-benzylideneamino-7-methoxy-decephalosporanate is dissolved in 4 ml. of methylene chloride, cooled to 0°C., and 0.08 ml. of thienylacetyl chloride added. To this is added 0.4 ml. of a 1 percent solution of water in tetrahydrofuran and the mixture stirred at 0°C. for 2 minutes. 0.2 Ml. of pyridine is then added dropwise over 30 minutes. The reaction mixture is then washed with pH 2 phosphate buffer followed by pH 7 buffer then dried and evaporated to yield the desired product, after purification using preparative TLC on silica gel using 2 percent methanol/chloroform as eluant, to give the benzhydryl 3-carbamoyloxymethyl-7-(2-thienylacetamido)-7-methoxy-decephalosporanate.

EXAMPLE 4

3-Carbamoyloxymethyl-7-Methoxy-7-(2-Thienylacetamido)-Decephalosporanic Acid

Benzhydryl 3-carbamoyloxymethyl-7-(2-thienylacetamido)-7-methoxy-decephalosporanate (300 mg.) in 0.5 ml. in anisole and 2.5 ml. of trifluoroacetic acid is reacted for 15 minutes at 10°C. The resulting mixture is evaporated at reduced pressure and flushed twice with anisole. The residue is dissolved in methylene chloride and extracted with 5 percent sodium bicarbonate solution. The aqueous solution is adjusted to pH 1.8 with 5 percent phosphoric acid and extracted with ethyl acetate. The organic solution is dried and evaporated to yield the pure 3-carbamoyloxymethyl-7-methoxy-7-(2-thienylacetamido)decephalosporanic acid, m.p. 165°–167°C. UV and NMR analysis provide data consistent with the assigned structure.

EXAMPLE 5

Sodium 3-Carbamoyloxymethyl-7-Methoxy-7-(2-Thienylacetamido)Decephalosporanate

The procedure as in Example 4 is followed, except that the pH is adjusted to 8.0 with dilute sodium hydroxide and concentrated under vacuum to remove the solvents. The mono sodium salt of 3-carbamoyloxymethyl-7-methoxy-7-(2-thienylacetamido)decephalosporanic acid is recovered.

EXAMPLE 6

Benzhydryl 3-Methyl-7-Benzylideneamino Decephalosporanate 0.687 G. of benzhydryl 3-methyl-7-aminodecephalosporanate is dissolved in 50 ml. of benzene, 0.250 g. of benzaldehyde is added and the mixture allowed to stand over magnesium sulfate for 1½ hours. The MgSO₄ is filtered off and the filtrate evaporated. The residual oil is triturated with petroleum ether and the petroleum ether is removed. The residue is taken up in a little ether and evaporated to give 0.865 g. of benzhydryl 3-methyl-7-benzylideneamino decephalosporanate, having IR and NMR peaks consistent with the structure: ir: — 5.62μ (β-lactam), 5.79μ (ester), 6.1μ (C=N); nmr (τ): 1.36 d

3.07, s ((C₆H₅)₂CH—); 4.64, d of d (C₇H); 4.86 d(C₆H); 6.7 q (C₂H); 7.9h, s (C₃—CH₃).

EXAMPLE 7

Benzhydryl 3-Methyl-7α-Methoxy-7-Benzylideneamino Decephalosporanate 0.234 G. of benzhydryl 3-methyl-7-benzylideneamino decephalosporanate is dissolved in 6 ml. of tetrahydrofuran under nitrogen. The solution is cooled to −78° and 0.310 ml. of a 2.3 M solution of phenyl lithium in benzene/diethylether is added dropwise over 0.5 minutes. The mixture is allowed to stir for 1 minute and treated with 0.132 g. of N-bromo succinimide in 4 ml. tetrahydrofuran.

The reaction mixture is allowed to stir at −78° for 2 minutes and then allowed to come to room temperature. The solvent is removed without warming until the volume is about 3 ml. The residue is taken up in methylene chloride (25 ml.) and washed twice with pH 7 buffer. The organic phase is dried and evaporated to 5 ml. and used directly in the next step.

To 0.250 g. silver oxide suspended in 10 ml. methanol is added the above 5 ml. methylene chloride solution of the bromo-Schiff's base, over 10 minutes. The reaction mixture is stirred for another 40 minutes.

The silver salts are filtered off and the filtrate is evaporated. The residue is taken up in methylene chloride and washed twice with pH 7 buffer. The organic phase is dried and evaporated to give a residue from which 0.142 g. of benzhydryl 3-methyl-7α-methoxy-7-benzylideneamino decephalosporanate is obtained by preparative thin-layer chromatography. Analysis shows the following: ir — 5.65 μ (β-lactam), 5.79 μ (ester; 6.1μ (C=N); nmr (τ): 1.30, s

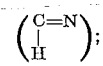

3.03 s ((C₆H₅)₂CH); 4.90 (s (C₆H)); 6.39, s (OCH₃); 6.79, s (C₂H); 7.9 s (C₃CH₃).

EXAMPLE 8

Benzhydryl 3-Methyl-7α-Methoxy-7-Phenylacetamido Decephalosporanate 0.140 G. of benzhydryl 7α-methoxy-7-benzylideneamino-3-methyl decephalosporanate is dissolved in 6 ml. tetrahydrofuran, 1 ml. of water is added and then 0.025 g. of PdCl₂. The mixture is stirred at room temperature for 3 hours. The solvent is removed under reduced pressure at ambient temperature. The residue is triturated with petroleum ether and the soluble material is discarded. The residue is taken up in 25 ml. methylene chloride, dried over MgSO₄ and evaporated to give 0.152 g. of residue. This is taken up in 4 ml. of methylene chloride, cooled to 0°, treated with 0.142 g. of pyridine and then with 0.042 ml. of phenylacetylchloride. The reaction mixture is stirred at 0° for 15 minutes and then allowed to warm up in the next 15 minutes. The reaction mixture is diluted with methylene chloride and washed once with pH 2 buffer and then with pH 7 buffer. The organic phase is dried and evaporated to give 0.210 g. of crude product from which 0.057 g. of benzhydryl 7α-methoxy-7-phenylacetamido-3-methyl-decephalosporanate is obtained by thin-layer chromatography. Analysis indicates: ir — 3.02μ (NH); 5.65 μ (β-lactam); 5.79 μ (ester), 5.95μ (amide); nmr (τ) 2.65 (aromatic protons); 3.13, s

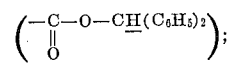

3.65 (NH); 5.0, s (C₆H); 6.36 s

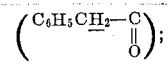

6.53, s (OCH₃); 6.91, s (C₂H); 7.83, s (C₃—CH₃). The benzhydryl blocking group can be removed to give the free acid using the same procedure described in Example 4.

EXAMPLE 9

Benzyl 6-Bromo-6-Benzylideneamino Penicillanate

A. Benzyl 6-Benzylideneamino Penicillanate

Benzyl 6-amino-penicillanic acid (3 g., 0.01 mole) is dissolved in 200 ml. of benzene, 1.06 g. (0.01 mole) benzaldehyde is added and the benzene is slowly distilled out until the volume of the solution is 50 ml. The remaining solvent is removed under reduced pressure.

The residue is taken up in ether 30 ml. and the solution allowed to stand in the refrigerator overnight. A small amount of an insoluble impurity separates out which is filtered off. The filtrate is evaporated to give 3.5 g. of benzyl 6-benzylideneamino penicillanate.

B. Benzyl 6-Bromo-6-Benzylideneamino Penicillanate 0.394 G. of benzyl 6-benzylideneamino penicillanate is dissolved in 15 ml. of anhydrous THF under nitrogen and cooled to −78°C. 0.5 Ml. of a 2.3 M solution of phenyl lithium is added dropwise. The reaction mixture is stirred at −78°C. for 5 minutes. 0.2 G. of N-bromosuccinimide in 3 ml. of anhydrous THF is then added. The cooling bath is removed and the reaction mixture is allowed to come to 0°C. The solvent is removed under reduced pressure and the residue is taken up in methylene chloride, 30 ml., and washed once with pH 7 phosphate buffer and then with water, dried and evaporated to a volume of about 10 ml.

EXAMPLE 10

Benzyl 6-Methoxy-6-Benzylideneamino Penicillanate 0.200 G. of silver oxide is suspended in 20 ml. of methanol. The solution of the bromo benzylideneamino compound obtained as in Example 9 is added dropwise over 10 minutes to the silver oxide suspension. The reaction mixture is stirred for another 15 minutes. The silver salts are filtered off and the filtrate is evaporated and the residue taken up in benzene and washed twice, with pH 7 phosphate buffer, then dried and evaporated to give 0.412 g. of the benzyl 6-methoxy-6-benzylideneamino penicillanate as a brownish red oil.

ir 5.61 μ (β-lactam), 5.72 (ester), 6.09 (C=N)

nmr 8.45 α (C$\underline{H}$=N), 5.57 α (5H), 5.17 α (C$\underline{H}_2$-C$_6$H$_5$), 3.53 α (O—CH$_3$), 1.57 α and 1.39 α (gem dimethyl).

EXAMPLE 11

Benzyl 6-Methoxy-6-Phenylacetamido Penicillanate 0.059 G. of benzyl 6-methoxy-6-benzylideneamino penicillanate is dissolved in 4 ml. CH$_2$Cl$_2$ and cooled to 0°C. and 0.066 ml. of phenylacetyl chloride is added. To this is added 0.36 ml. of a 1 percent solution of water in THF and the mixture is stirred at 0°C. for 2 minutes. 0.2 Ml. of pyridine is then added dropwise over 30 seconds and the mixture is stirred at 0°C. for 15 minutes. The reaction mixture is then washed with pH 2 buffer followed by pH 7 buffer and then dried and evaporated to give 0.101 g. of crude product which is purified, by preparative tlc on silica gel using 2 percent MeOH/CHCl$_3$ as eluant, to give the benzyl 6-methoxy-6-phenylacetamido penicillanate.

The benzyl ester can be removed in the usual manner by reduction over Pd catalyst to give the 6-methoxy-6-phenylacetamido penicillin.

EXAMPLE 12

Benzyl 6α-Methoxy-6-Phenylacetamido Penicillanate 0.165 G. of benzyl 6α-methoxy-6-benzylideneamino penicillanate is dissolved in 6 ml. THF, 1 ml. of water is added and then 0.035 g. of PdCl$_2$. The mixture is stirred at room temperature for 2 hours. The solvent is removed under reduced pressure without heating above room temperature. The reddish-brown residue is triturated with petroleum ether and the petroleum ether soluble material is discarded. The residue is taken up in 25 ml. of methylene chloride and dried over MgSO$_4$ and evaporated to dryness. The residue is taken up in 4 ml. of methylene chloride, cooled to 0°, and treated with 0.175 g. of pyridine and then with 0.058 g. of phenylacetylchloride. The mixture is allowed to stir at 0° for 15 minutes and then allowed to come to room temperature over the next 15 minutes. The reaction mixture is diluted with methylene chloride, washed once with pH 2 phosphate buffer and then with pH 7 phosphate buffer. The organic phase is dried and evaporated to give 0.267 g. of crude material from which 0.067 g. of benzyl 6α-methoxy-6-phenylacetamido penicillanate is obtained by preparative thin-layer chromatography. Analysis shows: ir: − 3.06 μ (NH), 5.64 μ (β-lactam), 5.72 μ (ester), 5.95 μ (amide); nmr, (τ) 2.65 and 2.68, 2 s, (C$_6$H$_5$); 3.45, s (NH); 4.42, s (5 H); 4.8, s (C$_6$H$_5$C$\underline{H}_2$O); 5.6, s (3 H); 6.36, s

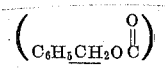

6.6, s (OCH$_3$), 8.65, s (gem CH$_3$).

What is claimed is:

1. The process of preparing the compound having the formula:

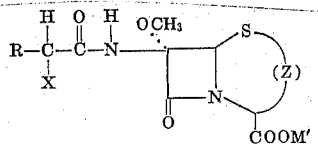

wherein

R is phenyl or a 5-membered heterocyclic ring having 1–2 hetero atoms, the latter being either S, O, or N;

X is hydrogen, amino, carboxyl;

M' is benzyl, benzhydryl, trimethylsilyl, trichloroethyl, methoxymethyl, benzoylmethyl, or methoxybenzyl;

(Z) is the group

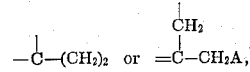

wherein A is hydrogen, loweralkanoyloxy, carbamoyloxy, thiocarbamoyloxy, N-loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium, all loweralkyl having 1–6 carbon atoms; is prepared which comprises treating a halo-imino compound of the formula:

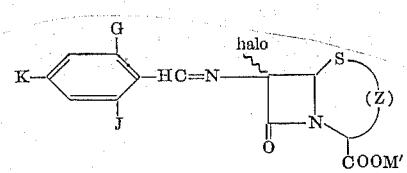

wherein halo is bromo or chloro; and wherein G, K, or J each is independently nitro, methyl sulfonyl, cyano, or hydrogen, and M' is benzhydryl, trimethylsilyl, trichloroethyl, methoxymethyl, benzoylmethyl or methoxybenzyl, with methanol in the presence of a molecular excess of silver oxide to prepare a methoxy-imino intermediate compound; followed by addition of substituted acetyl chloride having the formula:

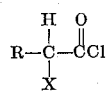

wherein R and X are as defined above, in the optional presence of a catalytic amount of a metal catalyst having the formula:

$$ML_n$$

wherein M is palladium, platinum, nickel, ruthenium, rhodium, cobalt, or iron; L is a ligand being halo, carbonyl, cyclopentadienyl, or phenylcyano; and $n$ is an integer which satisfies with valence requirements; at a temperature between about −20°C. and about 20°C.; and recovering the product thereby produced.

2. The process of claim 1 wherein the metal catalyst is employed in the reaction with the substituted acetyl chloride.

3. The process of claim 2 wherein the metal catalyst is palladium or platinum halide.

4. The process of claim 3 wherein the catalyst is palladious chloride.

5. The process of claim 1 wherein the metal catalyst is employed in an amount equivalent to about ½ to 1 molar equivalents of the methoxy-imino compound.

6. The process of claim 1 wherein R is phenyl, furyl, or thienyl, and X is hydrogen.

7. The process of claim 6 wherein (Z) is the group

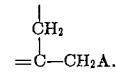

8. The process of claim 7 wherein A is loweralkanoyloxy of 1–6 carbon atoms, or carbamoyloxy.

9. The process of claim 8 wherein A is acetoxy or carbamoyloxy.

10. The process of claim 9 wherein A is carbamoyloxy.

11. The process of claim 10 wherein R is 2-thienyl.

* * * * *

UNITED STATES PATENT OFFICE
CERTIFICATE OF CORRECTION

Patent No. 3,843,641              Dated October 22, 1974

Inventor(s) Burton G. Christensen & Lovji D. Cama

It is certified that error appears in the above-identified patent and that said Letters Patent are hereby corrected as shown below:

In Claim 1, Column 14, line 47, should read as follows:

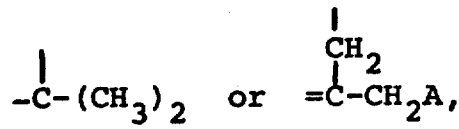

In Claim 1, Column 15, line 23, should read as follows:

-- integer which satisfies the valence requirements; at a --

Signed and sealed this 31st day of December 1974.

(SEAL)
Attest:

McCOY M. GIBSON JR.            C. MARSHALL DANN
Attesting Officer              Commissioner of Patents